US 6,547,428 B1

(12) United States Patent
Delattre (10) Patent No.: US 6,547,428 B1
(45) Date of Patent: Apr. 15, 2003

(54) MOTOR VEHICLE HEADLIGHT WITH LIGHT PIPE

(75) Inventor: Hugo Delattre, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 22 days.

(21) Appl. No.: 09/675,443

(22) Filed: Sep. 28, 2000

(30) Foreign Application Priority Data

Sep. 30, 1999 (FR) ............................................ 99 12225
Sep. 30, 1999 (FR) ............................................ 99 12227

(51) Int. Cl.[7] .............................................. F21V 8/00
(52) U.S. Cl. ...................................... 362/511; 362/556
(58) Field of Search ................................. 362/551, 554, 362/556, 581, 507, 511, 311, 516, 517, 520, 521, 296, 297, 346

(56) References Cited

U.S. PATENT DOCUMENTS

| 2,480,178 A | | 8/1949 | Zinberg |
| 4,662,713 A | | 5/1987 | Davies et al. |
| 5,165,772 A | * | 11/1992 | Wu ............................... 362/26 |
| 5,365,412 A | * | 11/1994 | Koppolu et al. ............ 362/511 |
| 6,102,559 A | * | 8/2000 | Nold et al. ................... 340/468 |
| 6,174,079 B1 | * | 1/2001 | Buard ........................ 362/297 |

FOREIGN PATENT DOCUMENTS

| DE | 39 00 419 | 7/1990 |
| EP | 167 721 | 1/1986 |
| EP | 613 031 | 8/1994 |
| FR | 2 606 861 | 5/1988 |
| FR | 2 755 210 | 4/1998 |

OTHER PUBLICATIONS

Parmley, Robert O.; Standard Handbook of Fastening and Joining; 1989; McGraw–Hill, Inc.; 2nd Edition; Sections 12–1 and 12–2, pp. 12–1 to 12–3.*

* cited by examiner

Primary Examiner—Sandra O'Shea
Assistant Examiner—Ismael Negron
(74) Attorney, Agent, or Firm—Morgan & Finnegan L.L.P.

(57) ABSTRACT

A headlight for a motor vehicle has a light source which illuminates the end of a light pipe. The light pipe has a number of transparent blades defining a plurality of oblique reflection facets cooperating with lenses. The transparent blades are bonded together at discrete points. Preferably, the bonding is accomplished with dots of glue, where each dot of glue has a diameter of between approximately 3 and 5 mm.

9 Claims, 4 Drawing Sheets

FIG_4

FIG_6

FIG. 5

FIG_7

FIG_8

MOTOR VEHICLE HEADLIGHT WITH LIGHT PIPE

FIELD OF THE INVENTION

The present invention concerns in general terms motor vehicle headlights.

BACKGROUND OF THE INVENTION

Headlights of the general type of the invention are described in the French patent N° 96 12972 published under the number 2 755 210, and French patent application N° 97 09210 published under the number 2 766 257, belonging to the Applicant.

This headlight comprises a real light source, means for concentrating the light radiation issuing from this source onto the end of a light pipe having a plurality of transparent blades juxtaposed in at least one direction, each transparent blade extending along the longitudinal axis of the light pipe and having, at least at its end furthest away from the real light source, an oblique reflection facet, the said facets constituting as many virtual light sources and being disposed so as to cooperate optically with interface elements with an axis parallel to the direction of illumination so that these project, in this direction, images corresponding to the facets.

Assembling the transparent blades of the light pipe of such a headlight is a tricky operation because of the number of blades to be assembled, the precise positioning of the reflection facets, and the fragility of the said blades produced preferentially from glass, this fragility relating particularly to their edges.

The present invention therefore proposes a novel headlight of the aforementioned type, in which a simple means of prior assembly of the blades together is provided so as to constitute a set of single-piece blades easy to manipulate in order to be mounted on a blade support.

SUMMARY OF THE INVENTION

According to the present invention there is provided a headlight for a motor vehicle, comprising a real light source, means for concentrating the light radiation issuing from this source onto the end of a light pipe consisting of a plurality of juxtaposed transparent blades in at least one direction, each transparent blade lying along the longitudinal axis of the said light pipe and having at least at its end furthest away from the real light source an oblique reflection facet, the said facets constituting as many virtual light sources and being disposed so as to cooperate optically with interface elements with their axis parallel to the direction of illumination so that they project, in this direction, images corresponding to the facets, wherein the transparent blades are bonded together at discrete points.

Preferably, each dot of glue has a diameter of between approximately 3 mm and approximately 5 mm.

According to a preferential embodiment of the headlight according to the invention, the transparent blades have different lengths, the shortest top transparent blade is bonded by a dot of glue to the bottom transparent blade, each intermediate transparent blade being bonded to another blade by two dots of glue situated at each end of the said blade.

The said transparent blades are produced from glass.

The glue used is advantageously a single-component glue which can be cross-linked under ultraviolet radiation, moisture or heat. It can be an epoxy glue or a silicone glue.

In addition, the present invention proposes a novel headlight of the aforementioned type, in which there is provided a system for mounting the light pipe providing good positioning of the facets, and of the light exit face of the latter vis-a-vis the interface elements so that the latter project, in the direction of illumination, images corresponding to the facets correctly positioned in the illumination beam, and good positioning of the entry face of the light pipe with respect to the light source, and in which there is provided a simple means of prior connection of the blades to each other so as to constitute a set of single-piece blades easy to manipulate in order to be mounted on a blade support.

More particularly, the headlight according to the invention has a reference piece for mounting the said light pipe, and at least one clamp able to grip the said juxtaposed transparent blades against the said reference piece in order to form a single-piece assembly.

Advantageously, the reference piece comprises a first generally flat horizontal part defining a horizontal reference plane, and a second generally flat vertical part, lying along the longitudinal axis of the light pipe and defining a vertical reference plane, and each clamp comprises a first internal surface opposite to the said first generally flat horizontal part, and a second internal surface opposite to the said second generally flat vertical part, the said first and second internal surfaces of each clamp having a protrusion exerting a thrust force on the juxtaposed transparent blades of the said light pipe in order to keep them in abutment against the first and second generally flat parts of the said reference piece, in a given position along the longitudinal axis of the said light pipe, so that their reflection facet or facets cooperate optically with the said interface elements so that the images of the facets projected by the said elements in the direction of illumination are positioned in a given manner.

Thus, advantageously according to the invention, the transparent blades constituting the light pipe are in abutment on two horizontal and vertical reference planes consisting of the first and second flat parts of the reference piece. The optical problems related to the manufacturing tolerances of the said blades are then dispensed with, the reflection facets of the said blades being positioned in a given manner with reference to the horizontal reference plane, and their light exit face being placed in a given manner with reference to the vertical plane.

Other advantageous and non-limitative characteristics of the headlight according to the invention are set out below.

The first flat horizontal part of the reference piece is a top part against which at least part of the top surface of the light pipe bears and the second flat vertical part of the reference piece is a front perforated part against which the front light exit faces of the transparent blades of the light pipe bear, and the first and second internal surfaces of each clamp are respectively a bottom horizontal surface coming into abutment against the bottom surface of the light pipe, and a rear vertical surface coming into abutment against the rear faces of the transparent blades.

Each clamp is a spring blade shaped like a U with a top leg positioned against the external face of the first flat horizontal part of the reference piece, and a bottom leg positioned against the bottom face of the light pipe.

The protrusions are formed with each clamp, or are attached to each clamp.

Each clamp is formed with the reference piece.

A compressible flexible element is provided between the light pipe and the first flat horizontal part of the reference piece. This flexible compressible element is a silicone shoe able to be compressed by approximately 20% of its thickness under the effect of the clamping of the reference piece and the said transparent blades in each clamp.

The first flat horizontal part of the reference piece has a flat high part and a flat low horizontal part, both horizontal, parallel and connected by a step, each clamp acting on the said flat low part and on the light pipe. The flat high horizontal part of the reference piece has an end edge aslant which carries a gauge for the positioning, on the horizontal axis of the light pipe, of the transparent blade directly in abutment against the flat high horizontal part of the said reference piece.

The transparent blades are bonded to each clamp and/or to the reference piece.

The reference piece is produced by moulding from aluminium. Each clamp is also advantageously produced by moulding from aluminium.

BRIEF DESCRIPTION OF THE DRAWINGS

The description which follows, with regard to the accompanying drawings, given by way of non-limitative presently preferred examples, will give a clear understanding of what the invention consists, and how it can be implemented.

In the accompanying drawings:

FIG. 1 is a partial schematic view in perspective of the principle of a headlight according to the invention, FIG. 2 is a view in section in a vertical plane of the headlight of FIG. 1, FIG. 3 is a front view of the end of the light pipe of the headlight of FIGS. 1 and 2.

DESCRIPTION OF THE PREFERRED EMBODIMENTS

In the various figures, like reference signs refer to like parts except where indicated.

With reference to FIGS. 1 to 4, a description will first of all be given in general terms of the principle of the headlight according to the invention, and then with reference to FIGS. 5 and 6 a description will be given of a practical embodiment of such a headlight.

FIGS. 1 to 3 of the present patent application depict a motor vehicle headlight which comprises a real light source 101 and means for concentrating the light radiation issuing from this source onto the end of a light pipe 200.

The means of concentrating the light radiating emitted from the real light source 101 consist essentially of an consisting of an elliptical reflector, or mirror, the light source 101 consisting of the filament of a motor vehicle lamp, preferably disposed in the axis of the elliptical reflector 102, at one of its foci.

The light flux issuing from the real light source 101 is reflected by the elliptical reflector 102 in a set of rays which converge towards the focal area of the second focus of the said elliptical reflector.

Provision can be made for the elliptical reflector 102 to be provided with an opening (not shown here) constituting a light window allowing the rays issuing from the real light source to pass directly.

The light pipe 200 lies in the axis of the elliptical reflector 102.

This light pipe 200 has a plurality of transparent blades, here of different lengths, juxtaposed in at least one direction, each transparent blade lying along the longitudinal axis of the light pipe 200 and substantially transversely to the direction of illumination E.

In this example embodiment, the longitudinal axis of the light pipe extends horizontally.

The light pipe 200 has here four transparent blades 210, 220, 230, 240, of different lengths, here superimposed in the vertical direction Y transverse to the axis of the light pipe and to the direction of illumination E.

Preferentially, each transparent blade is produced from glass.

Each transparent blade 210, 220, 230, 240 has, at its end furthest away from the real light source 101, an oblique reflection facet 210a, 220a, 230a, 240a, the said facets being disposed so as to cooperate optically with interface elements, here lenses, not shown, with their axis parallel to the direction of illumination so that these lenses project in this direction images corresponding to the facets.

This is because, in front of the optical system thus defined above, a set of interface elements is provided, convergent lenses (not shown in FIGS. 1 to 4) whose axes are substantially parallel to the direction of illumination E. The lenses are disposed in a relationship of optical cooperation with the facets 210a, 220a, 220b, 230a, 240a, which are substantially disposed at the focus of the lenses.

Each transparent blade has a light entry face extending transversely to the longitudinal axis of the light pipe. The set of light entry faces of the said blades constitutes the entry face of the light pipe (see FIG. 3). Each transparent blade 210, 220, 230, 240 also has a light exit face 211, 221, 231, 241 which, according to the embodiment depicted in FIGS. 1 and 2, extends vertically and perpendicularly to the direction of illumination marked by the arrow E.

Figure 4:
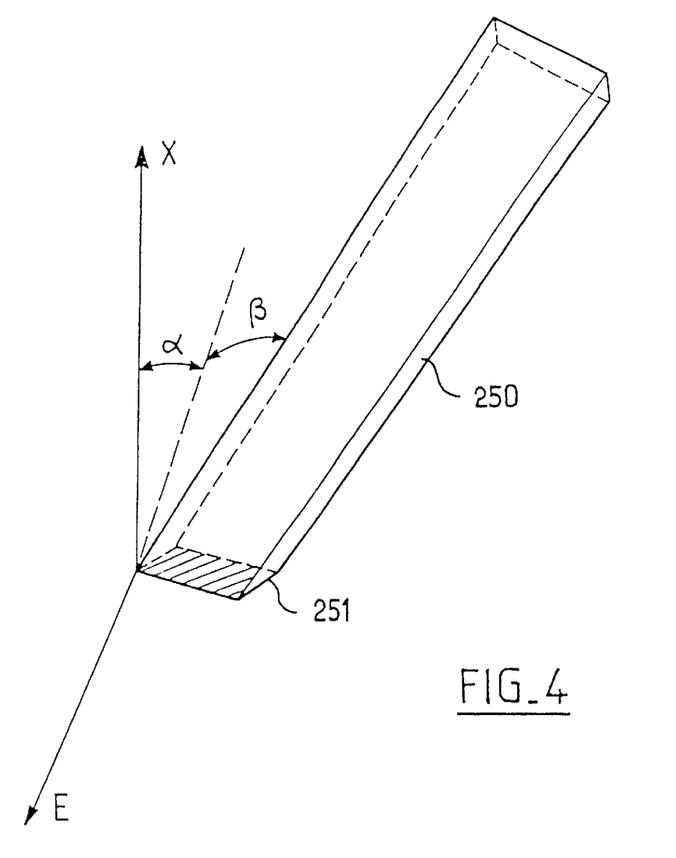
FIG. 4 is a schematic view of a transparent blade inclined so that its front light exit face is no longer vertical.

Naturally, according to a variant embodiment depicted more particularly in FIG. 4, it is possible to make provision for the light exit face of each transparent blade 250 to have an inclination α,β with respect to the vertical axis and therefore an inclination of an angle β different by 90 degrees with respect to the direction of illumination E.

In addition, it is possible, as shown by FIGS. 1 and 2, for one or more transparent blades to have other reflection facets 220b, these facets 220b being delimited by steps with a height equal to e, provided in the rear part of each blade, as is the case in particular with the transparent blade 220.

The reflection facets 210a, 220a, 220b, 230a, 240a of the light pipe 200 are inclined with respect to the direction of illumination E, their inclination being between 35 and 55 degrees, and preferably equal to 45 degrees.

Reference should be made for example to the embodiment depicted in FIG. 3c of French patent No. 2,514,105 belonging to the Applicant, according to which it can be seen that, for a refractive index of 1.7, an optimum is achieved for a facet angle of 53 degrees with respect to the direction of illumination E.

In particular, according to the embodiment depicted in FIG. 4, the transparent blade having an inclination different by 90 degrees with respect to the direction of illumination E, necessarily the associated reflection facet 251 has an inclination with respect to the vertical different by 45 degrees in order to reflect a light beam in the direction of illumination.

Advantageously, in order to avoid losses of light flux by refraction, provision can be made for the front and rear lateral internal faces of each transparent blade to be coated with a reflective coating.

In particular, the interfaces between the transparent blades can be aluminised.

As already described in French patent of invention No. 2,514,105, a convergent lens can be provided, disposed opposite the window provided in the elliptical mirror 102 in a relationship of optical cooperation with the real light source 101, which is substantially at its focus.

In addition, it is possible to provide a semi-reflective mirror disposed at the second focus of the elliptical mirror 102 between the light source and the entry to the light pipe 200 formed by the juxtaposition, here the superimposition, of the entry faces of the transparent blades making it up.

In this case, a convergent lens is provided disposed in the same way as the lenses associated with the facets of the transparent blades, in a relationship of optical cooperation with the semi-reflective mirror which is substantially disposed at the focus of this convergent lens.

With the aforementioned arrangement, the light flux issuing from the real light source 101, reflected by the elliptical mirror 102, enters the light pipe and each transparent blade 210, 220, 230, 240 making it up through their respective entry section and is reflected there, in a total reflection situation, by the associated facets 210*a*, 220*a*, 220*b*, 230*a*, 240*a*.

The elementary reflected beams are taken up by the lenses (not shown in FIGS. 1 to 4), which project the corresponding light beams towards the front of the headlight.

Likewise, the light flux intercepted by the semi-reflective mirror interposed between the light source and the light pipe entry is taken up by the associated lens and the direct light flux passing through the window of the elliptical mirror is taken up by the associated lens.

With such an arrangement, it is possible to control the illumination of each facet since the flux entering a transparent blade is necessarily conducted as far as the reflective facet situated at the end of the said blade. Each transparent blade constitutes an individual light pipe for a facet of the light pipe of the headlight according to the invention.

The illumination of each facet can be apportioned by the apportionment of illumination of each transparent blade carrying the said facet and thus form the final light beam provided for.

In projection, each facet 210*a*, 220*a*, 220*b*, 230*a*, 240*a*, in a total-reflection situation gives on a screen, through the corresponding lens, an image corresponding to the entry flux received by the facet and projected in the direction E, the virtual image given by each facet having a width equal to the side of the entry face of the corresponding transparent blade and a height equal to the height of the blade or to the height of the step e (with regard to the facet 220*b* of the blade 220).

The different elementary beams merge in a single emission beam and, by a judicious arrangement of the axes of the lenses more or less offset with respect to the axes of the elementary beams which they intercept, it is possible to produce any illumination arrangement, for a global illumination for a motor vehicle.

In particular, it is possible to ensure that the images projected in correspondence with the different facets are superimposed or juxtaposed and it is also possible to superimpose on these images or to juxtapose with these images those which come from the window in the elliptical mirror or semi-reflective mirror.

In order to produce a cut-off beam, as shown more particularly in FIG. 1, masks 301, 302, 303 are provided, disposed on the path of certain elementary beams of at least certain facets 210*a*, 220*a*, 200*b*, here on the front face of the corresponding transparent blades.

According to a variant, not shown, provision can be made for these masks to be placed directly on the facets concerned.

In addition, according to another variant, it is also possible to provide that certain facets have the profile corresponding to the shape of the desired cutoff.

Figure 5:
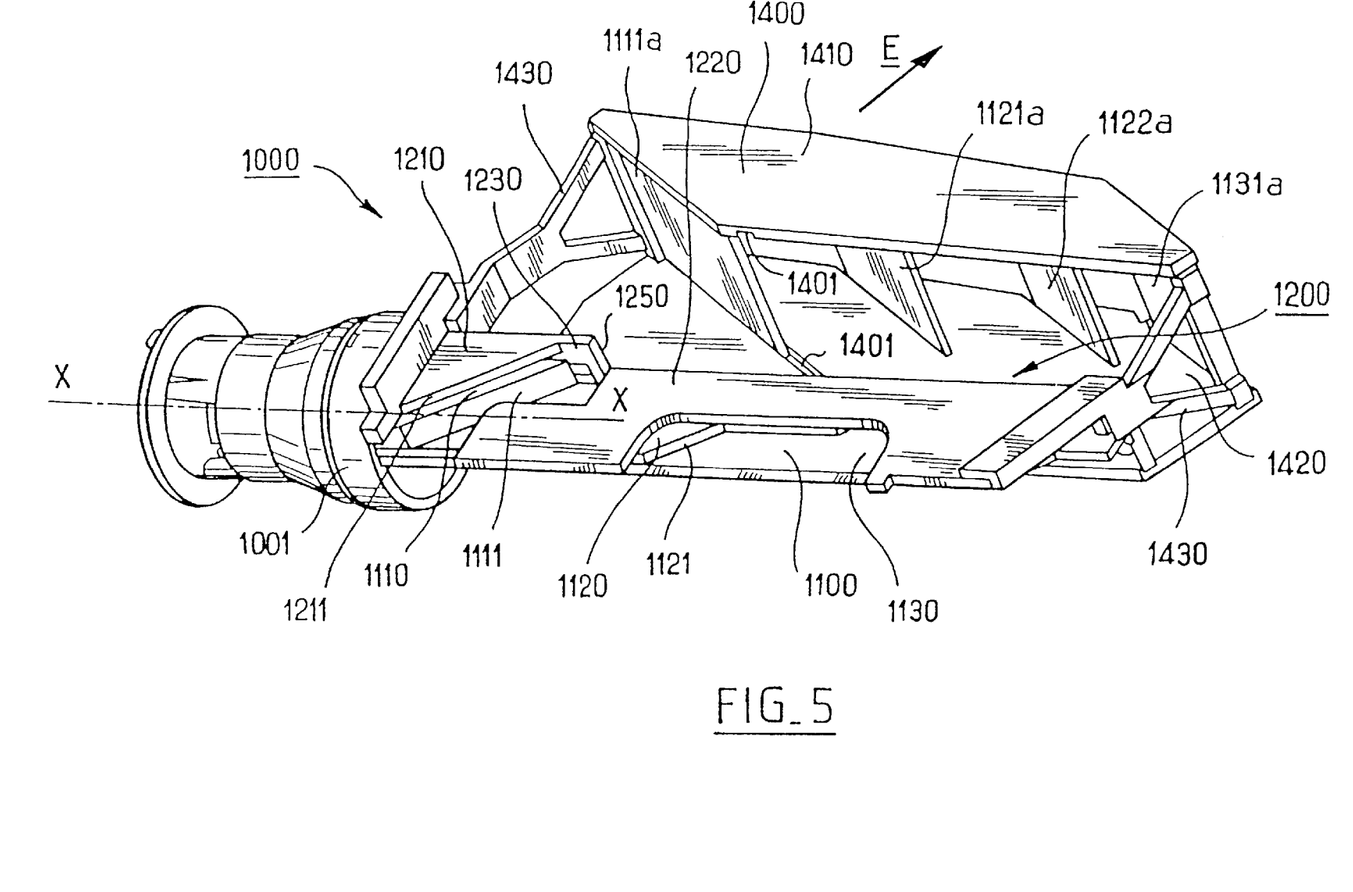
FIG. 5 is a schematic perspective view of a practical embodiment of the headlight of the type depicted in FIG. 1.

FIG. 5 depicts a headlight 1000 for a motor vehicle, of the same type as described previously.

It has an elliptical reflector or mirror 1001, the light source consisting of the filament of a car bulb, preferably disposed in the axis of the elliptical reflector 1001, at one of its foci.

The light pipe 1100 of the headlight 1000 is provided with a plurality of oblique reflection facets 1111, 1121, 1122 and 1131 (see more particularly FIG. 6) which cooperate with a plurality of interface elements 1111*a*, 1121*a*, 1122*a*, 1131*a*, here Fresnel lenses, which are homologous and have axes parallel to the direction of illumination E.

Figure 6:
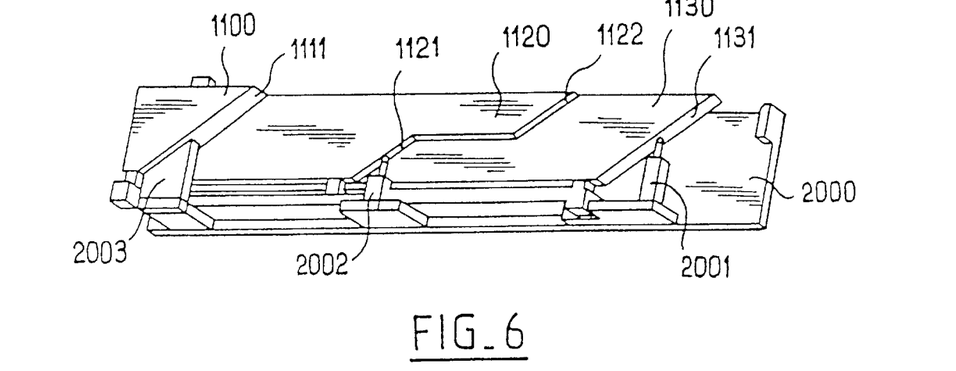
FIG. 6 is a perspective plan view of the mounting plate on which the superimposed transparent blades of the headlight of FIG. 5 are positioned.

As can be seen more particularly in FIG. 6, the light pipe 1100 consists of three transparent blades 1110, 1120, 1130, here with different lengths, superimposed in the vertical direction and transverse to the longitudinal axis X of the light pipe and to the direction of illumination E.

Each transparent blade is also produced from glass.

Each transparent blade 1110, 1120, 1130 has, at its end furthest away from the real light source, an oblique reflection facet 1111, 1122, 1131. The intermediate transparent blade also has another reflection facet 1121, delimited by a step provided in the rear part thereof.

These oblique reflection facets 1111, 1121, 1222, 1131 are inclined with respect to the direction of illumination E, their inclination being between 35 and 55 degrees, according to the positioning of the longitudinal axis of the light pipe with respect to the direction of illumination.

Each transparent blade has, at its end opposite to the facets, a light entry face extending transversely to the longitudinal axis of the light pipe. The set of light entry faces of the transparent blades constitutes the entry face of the light pipe. Each transparent blade also has a light exit face which is here a front face extending on a longitudinal side of the transparent blade, vertically and substantially perpendicularly to the direction of illumination E.

The headlight 1000 also has a reference piece 1200 for mounting the said light pipe 1100.

This reference piece 1200 comprises first and second generally flat horizontal parts 1210, 1220, which extend along the longitudinal axis X of the light pipe 1100 and which defines a horizontal reference plane. The reference piece 1200 also has a generally flat vertical part 1230, which extends perpendicularly to the first and second flat horizontal parts 1210, 1220 and which defines a vertical reference plane.

The juxtaposed transparent blades 1110, 1120, 1130 of the light pipe are mounted in abutment against the first and second horizontal flat parts 1210, 1220, and vertical flat part 1230 of the said reference piece 1200, in a given position along the longitudinal axis X of the light pipe 1100 so that their oblique reflection facets cooperate with the associated Fresnel lenses 1111a, 1121a, 1122a, 1131a so that they project, in the direction of illumination E, images corresponding to the facets at a given point in the illumination beam.

It should be stated that, in a headlight with a light pipe with transparent blades, nothing is provided to ensure the introduction of light at the required height on the entry faces of the transparent blades. The illumination profile at the entry face of the light pipe is not uniform but has a high concentration on an approximately circular area a few millimetres in diameter, which must be centred on the interface of the blades 1110 and 1120. The scattering of the light over the thickness of the blades associated with the manufacturing tolerances of the flat glass for the formation of the blades does not in principle make it possible to guarantee that this area with a high level of illumination is correctly positioned with respect to this interface, which then impairs the quality of the light being obtained.

The top face of the transparent blade 1120 of the light pipe is fixed to the internal face of the second horizontal flat part 1220 of the reference piece 1200 and the transparent blade 1110 rests on the blade 1120.

Thus the interface of these blades is perfectly positioned in a given manner with respect to the reference piece 1200 and the indexed mounting of the reflector on the reference piece then makes it possible to be free of the aforementioned drawback.

The reference piece 1200 is here a monobloc piece, but in a variant embodiment, not shown, provision can be made for this reference piece to be produced in several parts connected together. Its first flat generally horizontal part is a top part comprising a higher first horizontal flat part 1210 and a lower second horizontal flat part 1220, both parallel and connected by a step 1250.

The top surface of the light pipe 1200 bears against the internal face of the generally flat horizontal parts of the reference piece. More particularly, the top face of the shortest transparent blade 1110 bears against the internal face of the higher first horizontal flat part 1210, and the top surface of the projecting part of the transparent blade 1120 situated just below the shortest transparent blade bears against the internal face of the second horizontal flat part 1220. The high part of the first flat horizontal part of the reference piece part has an edge which extends aslant (with respect to the longitudinal axis X) from the step 1250 as far as its end situated on the reflector side. This slanting edge carries a gauge which extends projecting in the direction of the light pipe.

This gauge makes it possible to position the transparent blade, along the longitudinal axis of the light pipe, directly in abutment against the flat high part of the said reference piece 1200, here the shortest transparent blade 1110.

The flat vertical part 1230 of the reference piece 1200 is a front part perforated according to a particular profile which is a function of the length and positioning of the oblique reflection facets of the transparent blades, against which bear the front light exit faces of the transparent blades of the light pipe.

The reference piece 1200 has a frame, here generally circular in shape, for mounting the elliptical reflector 1101 carrying the real light source. The length of the shortest transparent blade, transparent blade 1110, of the light pipe is such that the second focus of the elliptical reflector mounted in the circular frame is situated at the end of transparent blade 1110 carrying the oblique reflection facet 1111, in order to obtain, on this reflection facet, a concentration of light which will give the illumination beam its range.

At the rear of the reference piece 1200 and at its end furthest away from the reflector, drillings are provided for fixing a holding piece 1300 to the said reference piece 1200.

This is because the headlight 1000 has here a holding piece 1300 fixed to the reference piece 1200, in abutment against the rear and bottom faces of the light pipe in order to hold the said transparent blades 1110, 1120, 1130, by compression, in abutment against the first and second horizontal flat parts 1210, 1220, and vertical flat part 1230 of the said reference piece 1200.

This piece for holding by compression 1300 has a base extending along the longitudinal axis X of the light pipe, in a horizontal plane parallel to the horizontal reference plane defined by the first flat horizontal part of the reference piece. A vertical upright extends along the longitudinal rear edge of the horizontal base, and is intended to come into abutment against the rear face of the light pipe.

This holding piece 1300 is fixed to the reference piece 1200 by a system of screws introduced into facing drillings, provided respectively on the holding piece and on the reference piece.

According to another embodiment, not shown, provision can be made for the holding piece and reference piece to form a single piece, the holding piece then forming only a horizontal return extending from the bottom edge of the flat vertical part of the reference piece towards the rear of the headlight. This horizontal return is situated below the light pipe and makes it possible to keep the light pipe pressed against the reference surfaces of the reference piece.

It is possible to provide, in the lighting module 1000, an elastic pressure element here not shown, such as a leaf spring, between the light pipe and the first flat part of the reference piece. This elastic pressure element can be placed between the internal face of the high part of the first flat part of the reference piece and the top surface of the shortest transparent blade 1110. It participates in the holding by compression of the transparent blades against the first flat horizontal part of the reference piece.

In addition, as shown more particularly in FIG. 5, the headlight 1000 has a front mounting piece 1400 which has two horizontal plates 1410, 1420 disposed parallel opposite each other and fixed together by vertical uprights. Mounting lugs 1430 extend from the vertical uprights of the front mounting piece 1400 and are fixed to the reference piece 1200, at each of its ends. The opposite internal faces of the base plates 1410, 1420 of the front mounting piece 1400 have grooves forming runners for mounting the Fresnel lenses 1111a, 1121a, 1122a, 1131a. The grooves provided for mounting the Fresnel lenses have a certain orientation with respect to the direction of illumination E, and are positioned with respect to the second flat vertical part of the reference piece, so that the Fresnel lenses mounted in these grooves, the front mounting part being fixed to the reference piece, cooperate optically with the oblique reflection facets of the transparent blades mounted in abutment against the reference piece, in order to project, in the direction of illumination, an image corresponding to the said facets.

According to a variant embodiment, not shown, provision can be made for the Fresnel lenses 1111a, 1121a, 1122a, 1131a to form a single-piece assembly fixed to the reference piece of the headlight whilst being fixed to a fixing lug extending from the said reference piece towards the front and top of the headlight.

In order to produce a dipped beam, it is possible to provide, in the headlight 1000, masks disposed on the path of certain elementary beams of at least certain reflection facets, between the front face of the transparent blades in question and the associated interface elements, the said masks being secured to the front mounting piece fixed to the reference piece in a position which is determined with respect to the latter.

The said masks, here not shown, and the front mounting piece can form a single piece. Provision can also be made, according to another embodiment, for these masks to be attached to the said front mounting piece and fixed thereto by fixing means.

It should be noted that the reference piece 1200, the holding piece 1300 and the mounting piece 1400 can advantageously be produced by aluminium casting. The Fresnel lenses 1111a, 1121a, 1122a, 1131a can be produced from poly-n-methylmethacrylimide.

FIG. 6 shows the principle of indexed mounting of the transparent blades 1130, 1120, 1110 of the headlight 1000 depicted in FIG. 5.

As shown more particularly in this FIG. 6, a mounting plate 2000 is provided, bearing on a lateral upright of the gauges 2001, 2002, 2003 for the indexed positioning of the transparent blades 1130, 1120, 1110 along the longitudinal axis X of the light pipe. For this purpose, the said gauges are placed at given points along the longitudinal axis of the said plate 2000.

The mounting piece 1300 is positioned on the mounting plate 2000, and then the transparent blades 1110, 1120, 1130 of the light pipe are superimposed on the holding piece 1300, according to decreasing lengths, each transparent blade 1130, 1120, 1110 being positioned so that one of its oblique reflection facets 1131, 1121, 1111 comes into abutment against the corresponding positioning gauge 2001, 2002, 2003 of the mounting plate 1200.

With regard to transparent blade 1120, it is the first oblique reflection facet 1121 provided on its rear face which comes into abutment against the corresponding gauge 2002 on the mounting plate 2000.

Advantageously, during the indexed positioning of the transparent blades, the said blades are bonded together at isolated points in order to form a block of blades fixed together, positioned in a given manner with respect to each other.

Such a block of blades can easily be manipulated in order to be mounted on the reference piece 1200, and best withstands the impacts and vibrations generated during the running of the vehicle.

This is because the slight friction generated by the glass-to-glass contact between the different blades of the light pipe constitutes a problem for resistance to impacts and vibrations of the headlight when the vehicle is running, since the superimposed glass blades have a tendency to slide on each other and then no longer fulfill their optical role.

Bonding the transparent blades together resolves the aforementioned problem.

However, the surface area taken up by the glue on the said glass blades must be as small as possible so as not to impair the optical function of the light pipe of the headlight.

Thus, advantageously, each dot of glue deposited on the said blades has a diameter of between approximately 3 and 5 mm.

According to the example depicted in FIGS. 5 and 6, the shortest transparent blade, transparent blade 1110, is bonded by a dot of glue to transparent blade 1120, itself bonded by two dots of glue situated at each end of the said blade, on the longest transparent blade, transparent blade 1130.

The glue used for fixing the said glass blades to each other is preferentially a single-component glue, which can be cross-linked under ultraviolet radiation, moisture or heat. This glue is an optical glue which sticks at temperatures of around 250° C. applied continuously.

Advantageously, a silicone glue of the RTV type from GE is used, or an epoxy glue of the type NOA71 or NOA65 from Epotecny.

The latter is a single-component resin, 100% cross-linkable under ultraviolet radiation with maximum absorption in the range of wavelengths from 350 nm to 380 nm. Its cross-linking under ultraviolet radiation takes place in a few seconds according to the intensity of the radiation and the thickness of the dot of glue.

Before exposure, this glue has a Brookfield cone/plane viscosity at 25° C. and at 5 rev/min equal to 2.6±20% Pa.s, and a density of 1.12 g/cm$^3$.

After setting, this glue has a Shore D hardness of 50 to 55, a breaking elongation of 80%, a tensile strength of 100 to 110 kg/cm$^2$, a modulus of elasticity of 1400 kg/cm$^2$, a light transmission (at wavelengths from 400 to 1000 nm) greater than 98%, a refractive index of 1.52 and a degradation temperature of between approximately 330 and 350° C.

Then the reference piece (not shown in FIG. 6) is put in place on the superimposition of transparent blades 1130, 1120, 1110, bonded together, so that on the one hand its first flat horizontal part covers the top surface of transparent blade 1110, as well as the top surface of the projecting part of transparent blade 1120 positioned just below the latter, and on the other hand its second flat vertical part comes against the front light exit faces of the said transparent blades.

The holding piece is fixed to the reference piece by means of a screw system so that the said holding piece, by compression, keeps the said superimposed transparent blades in abutment against the first and second flat parts of the reference piece, and then the mounting plate is withdrawn.

According to a variant mounting, not shown, which does not include any holding piece, provision can be made to mount the block of transparent blades bonded together on a reference piece having a simple bottom horizontal return so that the latter is placed against at least part of the bottom surface of transparent blade 1130 of the light pipe. In this position the bottom horizontal return of the reference piece is placed against at least part of the bottom surface of the bottom transparent blade 1130 of the light pipe.

Figure 7:
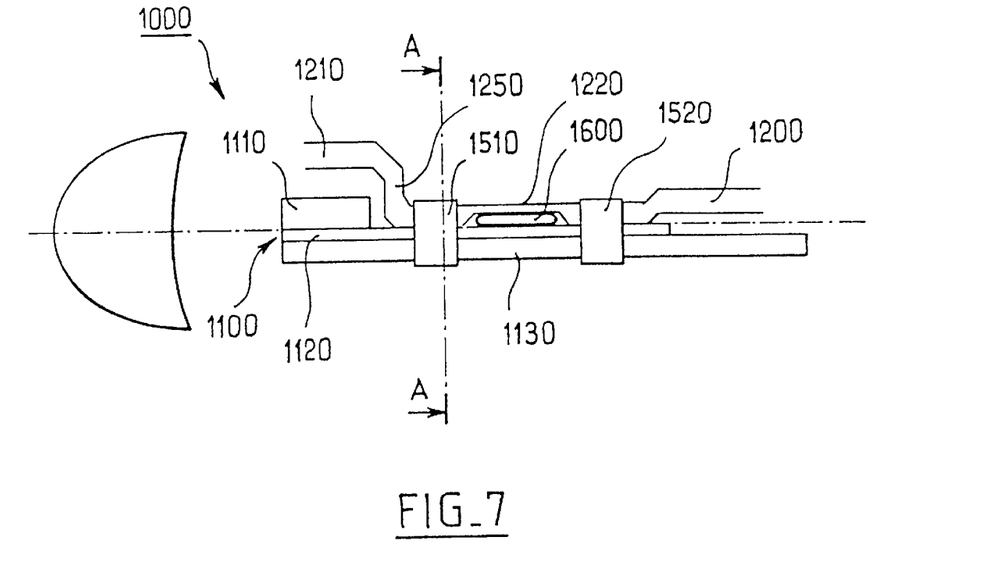
FIG. 7 is a schematic side view of the headlight according to the invention.
Figure 8:
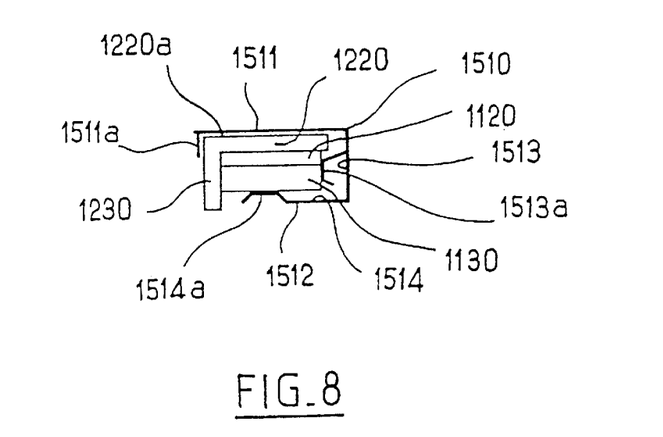
FIG. 8 is a view in section along the plane A—A of FIG. 7.

With reference now to FIGS. 7 and 8, the fixing of the light pipe to the reference piece of the headlight according to the invention will be described in detail.

As shown in these figures, in order to fix the light pipe 1100 to the reference piece 1200 of the headlight, two clamps 1510 and 1520 are provided, distributed over the length of the said light pipe 1100, able to clamp between their legs the said reference piece 1200 and the said superimposed transparent blades 1110, 1120, 1130 against each other in order to form a single-piece assembly.

As shown more particularly in FIG. 8, each clamp 1510 is a spring blade shaped like a U, with a top leg 1511 positioned against the external face of the second flat horizontal part 1220 of the reference piece 1200, and a bottom leg 1512 positioned against the bottom face of the light pipe.

The top leg 1511 of each clamp 1510 has a vertical return 1511a able to be positioned in abutment against a top part of the front face of the vertical part 1230 of the reference piece (see FIG. 8). This vertical return 1511a participates in the locking of each clamp 1510 on the reference piece.

Thus positioned, each clamp, by elastic deformation, exerts a pressure force on the superimposed transparent blade 1120 and transparent blade 1130.

In addition, each clamp 1510 comprises a first internal surface 1513 opposite to the said second generally flat horizontal part 1220 of the reference piece, and a second internal surface 1514 opposite to the generally flat vertical part 1230 of the reference piece, which each have a protrusion 1513a, 1514a exerting a thrust force on the juxtaposed transparent blades of the said light pipe in order to keep them in abutment against the first and second generally flat horizontal parts 1210, 1220, generally flat vertical part 1230 of the said reference piece 1200, in a given position along the longitudinal axis X of the said light pipe 1100, so that their reflection facet or facets 1111, 1121 cooperate optically with the said Fresnel lenses 111a, 1121a so that the images of the facets projected by them in the direction of illumination are positioned in a given manner.

The first and second internal surfaces of each clamp 1510 are respectively a bottom horizontal surface 1513 coming into abutment against the bottom surface of the light pipe, and a rear vertical surface 1514 coming into abutment against the rear faces of the transparent blades.

The protrusions 1513a, 1514a are formed in one piece with each clamp or are attached to each clamp.

According to a variant embodiment, not shown, each clamp is formed with the reference piece. In this case each clamp comprises solely a vertical rear part which extends from the low part of the said reference piece, this rear vertical part comprising the internal protrusion and coming to bear against the rear faces of the transparent blades, and a horizontal bottom part provided internally with a protrusion and coming to be pressed by elastic deformation against the bottom surface of the light pipe.

Each clamp is produced by moulding from aluminium, just like the reference piece.

In addition, a compressible flexible element 1600 is provided between the light pipe 1100 and the second flat horizontal part 1220 of the reference piece 1200. This compressible flexible element is a silicone shoe 1600 able to be compressed by approximately 20% of its thickness under the effect of the clamping of the reference piece and the said transparent blades in each clamp. In the expanded state, it has a thickness of approximately 8 mm.

This compressible flexible element makes it possible to increase still further the friction forces between the superimposed transparent blades, which increases the stability of the lighting module during the operation of the vehicle.

The system of mounting the light pipe of the headlight 1000 makes it possible to correctly position the light exit faces of the transparent blades, and the oblique reflection facets provided at the end and possibly on the rear face of the said transparent blades, with respect to two reference planes so that the said facets cooperate optically with the lenses so that the images of the said facets projected by the lenses in the direction of illumination are positioned in a given fashion in order to form the standard illumination beam. This positioning with respect to two reference planes dispenses with the differences due to the manufacturing tolerance of the individual blades.

In addition, advantageously, the fact that the Fresnel lenses and the masks are fixed to the same mounting piece positioned in a given fashion with respect to the reference plate ensures correct relative positioning of the said lenses and of the said masks, whatever the phenomena of scattering and expansion which may occur during the functioning of the lighting module. The lenses and masks are also correctly positioned with respect to the exit faces of the transparent blades, and the said oblique reflection facets. In all cases, the front mounting piece makes it possible to preserve the relative positioning of the lenses and masks, which makes it possible to obtain a clear cutoff of the lighting beam.

In addition, bonding the transparent blades together ensures good resistance of the light pipe to the impacts and vibrations due to travel.

In addition, the holding of the said blades by the clamps on the reference piece ensures good resistance of the light pipe to the impacts and vibrations due to travel. With such a system, it is not necessary to provide, on the entry face of the said blades, a blade locking piece for holding them in position along the longitudinal axis of the light pipe, and thus no light flux emitted by the reflector is lost.

The present invention is in no way limited to the embodiments described and depicted, but a person skilled in the art will know how to make any variant thereto in accordance with its spirit.

What is claimed is:

1. A method for producing a headlight for a motor vehicle, comprising:
   bonding together at discrete points a plurality of transparent blades to form a single-piece light pipe, each transparent blade having an oblique reflection facet at one end, such that all the transparent blades in the light pipe are longitudinally aligned with their reflection facets on the same end;
   mounting the light pipe on a blade support; and
   combining the mounted light pipe with parts to form the headlight comprising:
      a real light source,
      a reflector to concentrate light from the real light source onto the end of the light pipe opposite the oblique reflection facets, thereby causing each oblique reflection facet to act as a virtual light source, and
      a plurality of interface elements whose axes are parallel to the direction of illumination so that they project images corresponding to the oblique reflection facets in this direction.

2. The method according to claim 1 wherein, the bonding of the transparent blades further comprises using a mounting plate to provide the alignment and indexed positioning of the transparent blades, which form the single-piece light pipe.

3. The method according to claim 1 wherein, the transparent blades are bonded together with dots of glue having diameters of approximately 3 to 5 mm.

4. The method according to claim 1 wherein, the transparent blades have different lengths and are bonded together in order from longest to shortest.

5. The method according to claim 1 wherein, the transparent blades are bonded together with a single-component glue that can be cross-linked under ultraviolet radiation, moisture or heat.

6. The method of claim 1, wherein the blade support comprises a reference piece mounted with at least one clamp, wherein the reference piece comprises a horizontal reference plane and a vertical reference plane, which runs along the longitudinal axis of the light pipe, such that the light pipe abuts the vertical and horizontal reference plane to provide proper alignment.

7. The method of claim 6, wherein the horizontal reference plane comprises a high part and a low part, and the high part has a slanted edge running across the longitudinal axis, wherein the slanted edge has a gauge to aid in the positioning of the light pipe along the longitudinal axis.

8. A headlight for a motor vehicle, comprising:

a real light source;

a light pipe, for directing light in a direction of illumination, and having a light receiving end closest to the real light source and a light emitting end farthest from the real light source, comprising:

a plurality of transparent blades stacked one.atop another, aligned along the axis from the light receiving end to the light emitting end, and adhered to one another at discrete points;

wherein each of the transparent blades have at least one oblique reflection facet at the light emitting end of the light pipe, such that each facet constitutes a virtual light source;

a reflector to concentrate the light emanating from the real light source onto the light receiving end of the light pipe;

a plurality of interface elements that have axes of illumination parallel to the direction of illumination so that they can project light emanating from the virtual light sources in the direction of illumination;

a reference piece for mounting the light pipe;

at least one clamp, to clamp the transparent blades against the reference piece to form a single-piece assembly;

a compressible flexible element, provided between the light pipe and a first horizontal flat part of the reference piece; and wherein the flexible element is a silicone shoe able to be compressed by approximately 20% of its thickness under the effect of the clamping of the reference piece and the transparent blades in each clamp.

9. A headlight for a motor vehicle, comprising:

a real light source;

a light pipe, for directing light in a direction of illumination, and having a light receiving end closest to the real light source and a light emitting end farthest from the real light source, comprising:

a plurality of transparent blades stacked one atop another, aligned along the axis from the light receiving end to the light emitting end, and adhered to one another at discrete points;

wherein each of the transparent blades have at least one oblique reflection facet at the light emitting end of the light pipe, such that each facet constitutes a virtual light source;

a reflector to concentrate the light emanating from the real light source onto the light receiving end of the light pipe;

a plurality of interface elements that have axes of illumination parallel to the direction of illumination so that they can project light emanating from the virtual light sources in the direction of illumination;

a reference piece for mounting the light pipe, the reference piece having a first flat horizontal part comprising a horizontal high flat part and a horizontal low flat part, wherein the horizontal high flat part is connected to the horizontal low flat part by a step;

at least one clamp, to clamp the transparent blades against the reference piece to form a single-piece assembly, wherein each clamp acts on the horizontal low flat part; and wherein the horizontal high flat part has a slanting edge which carries a gauge for positioning, along the longitudinal axis of the light pipe, of the transparent blade directly in abutment against the horizontal high flat part.

* * * * *

UNITED STATES PATENT AND TRADEMARK OFFICE
CERTIFICATE OF CORRECTION

PATENT NO. : 6,547,428 B1  Page 1 of 1
DATED : April 15, 2003
INVENTOR(S) : Hugo Delattre It is certified that error appears in the above-identified patent and that said Letters Patent is hereby corrected as shown below:

<u>Column 13,</u>
Line 12, please delete "one.atop" and insert therefor -- one atop --

Signed and Sealed this

First Day of July, 2003

JAMES E. ROGAN
*Director of the United States Patent and Trademark Office*